Jan. 18, 1949. G. D. FRAUNFELDER 2,459,372
TANDEM AXLE RUNNING GEAR FOR TRAILERS OR THE LIKE
Filed July 18, 1945 7 Sheets-Sheet 2

INVENTOR.
George D. Fraunfelder
BY
ATTORNEY.

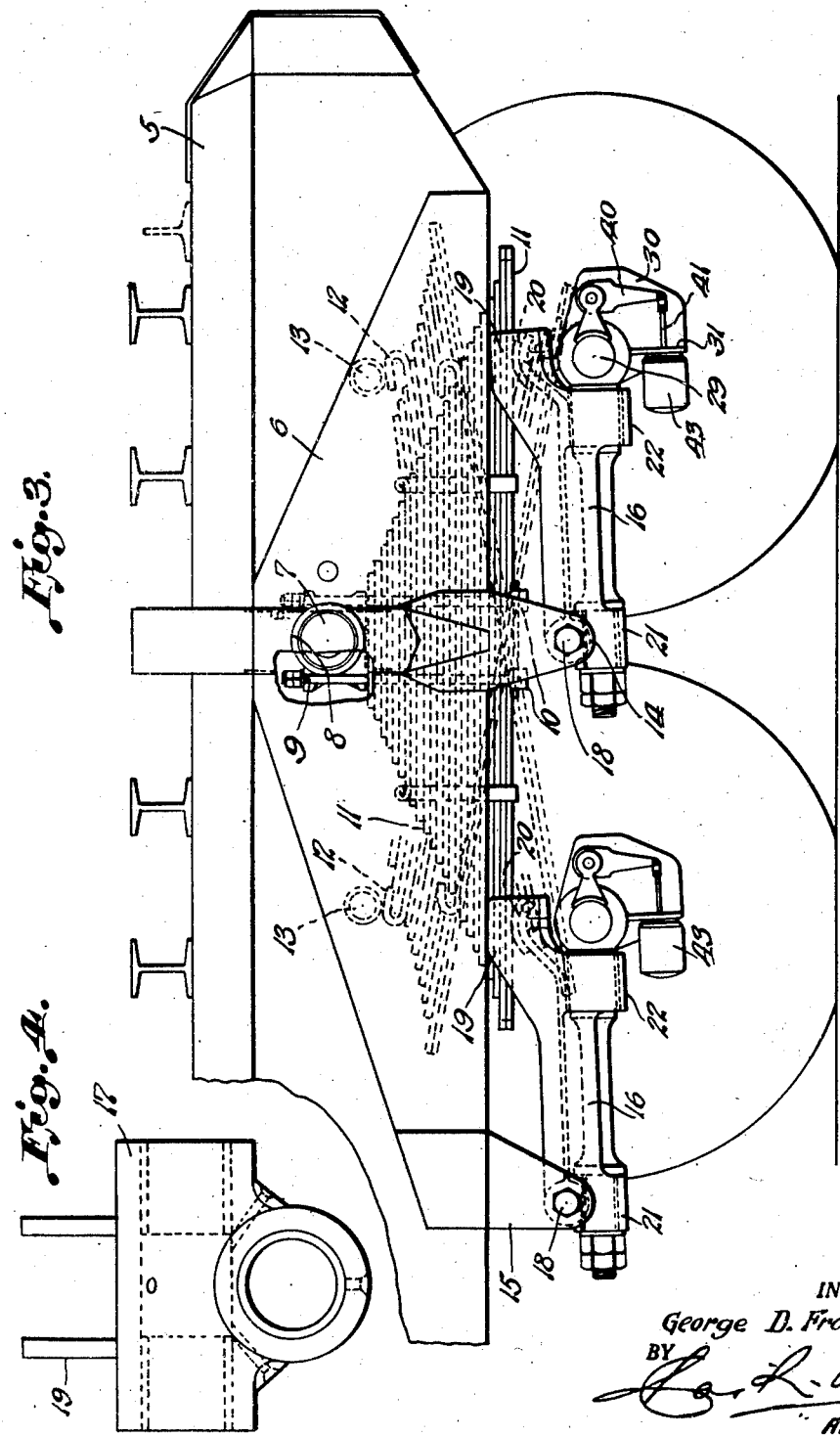

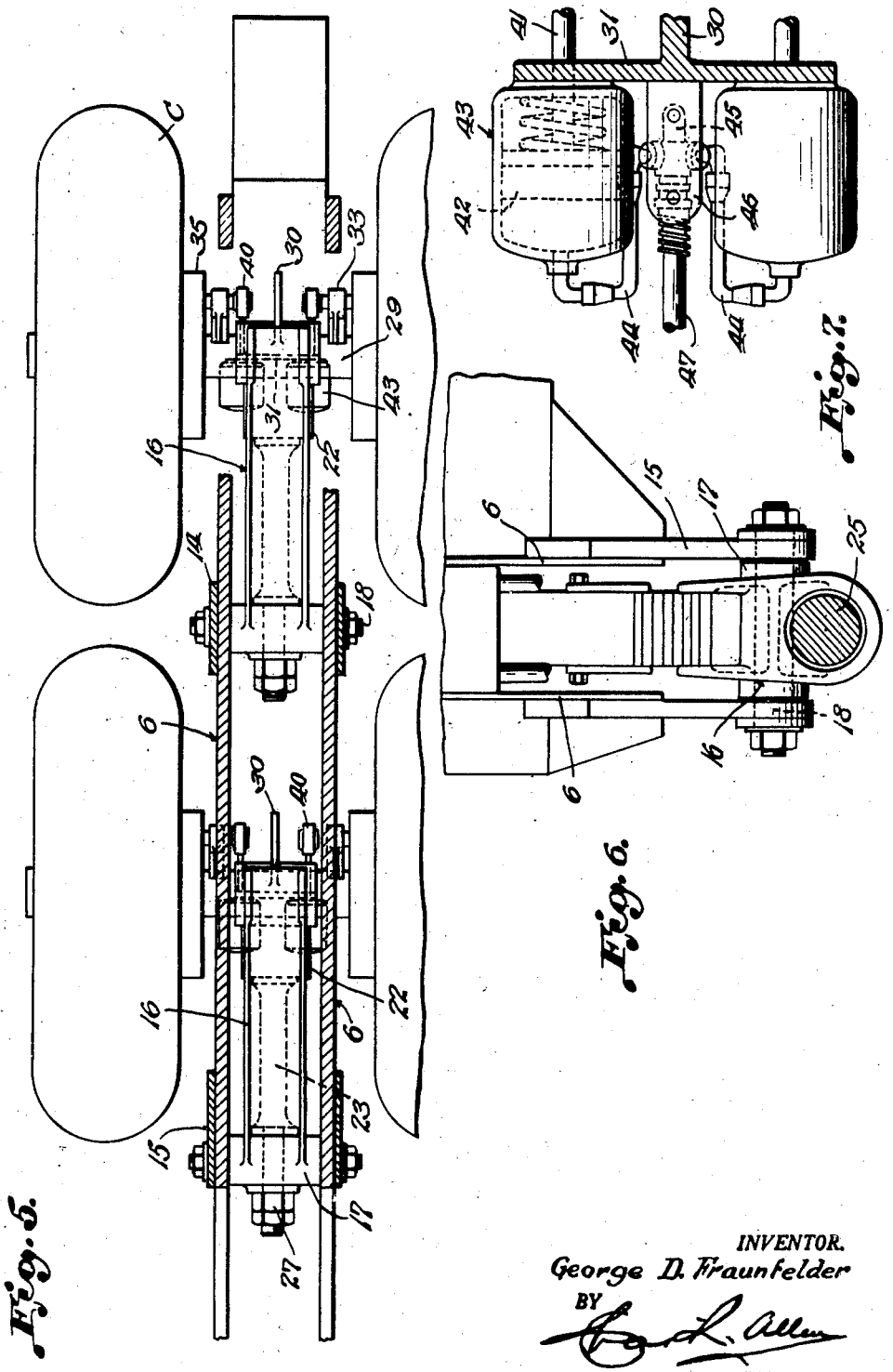

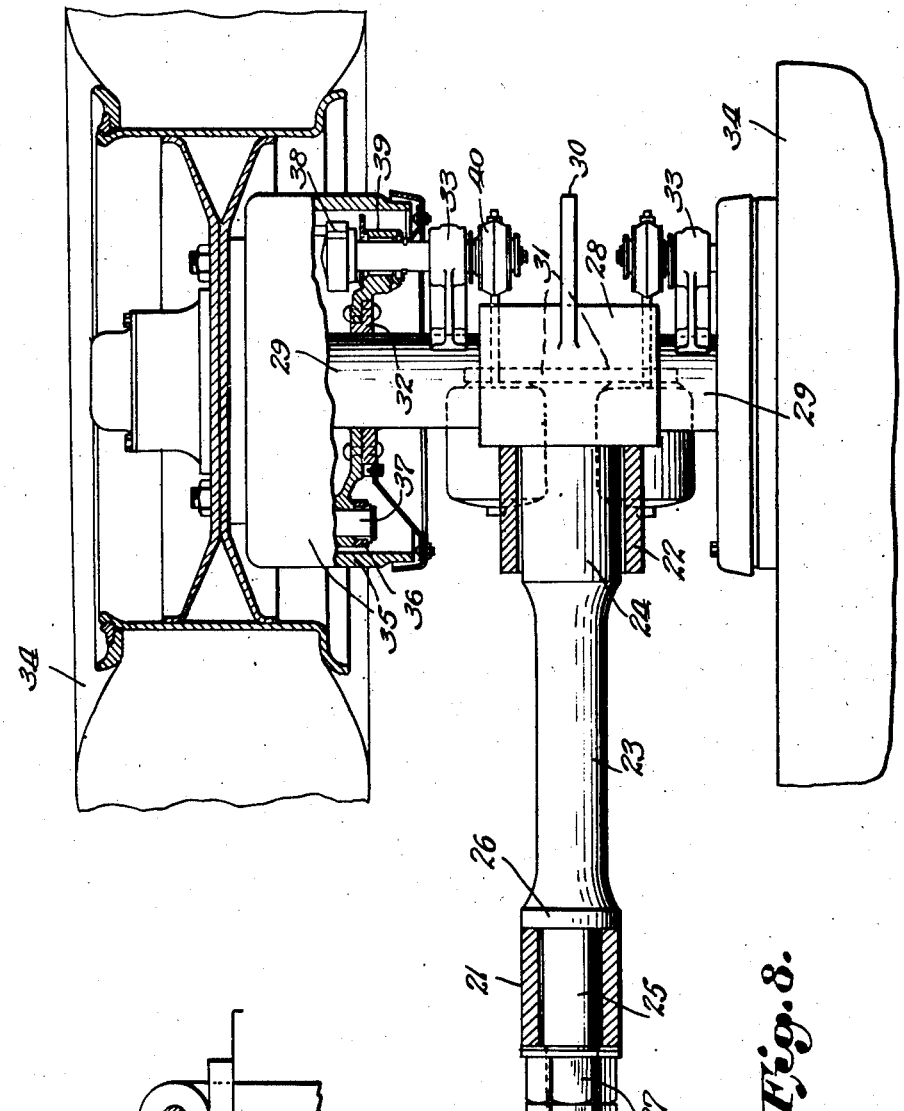

Jan. 18, 1949.  G. D. FRAUNFELDER  2,459,372
TANDEM AXLE RUNNING GEAR FOR TRAILERS OR THE LIKE
Filed July 18, 1945  7 Sheets-Sheet 6
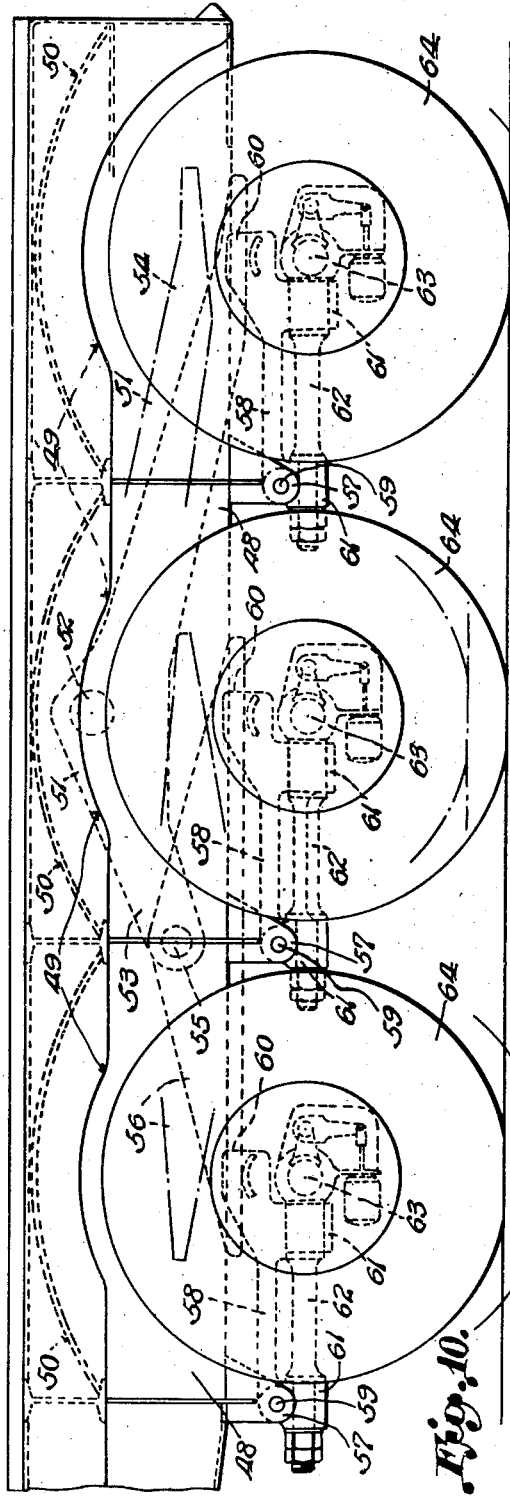
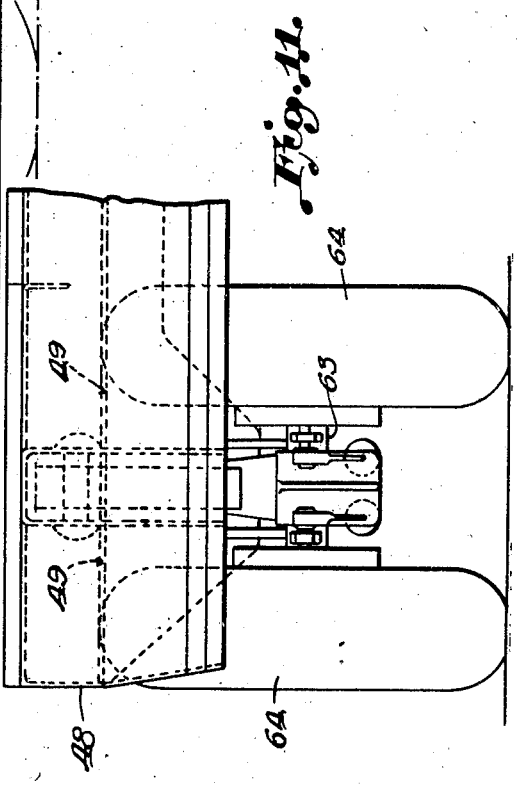
INVENTOR.
George D. Fraunfelder
BY
ATTORNEY.

Jan. 18, 1949.   G. D. FRAUNFELDER   2,459,372
TANDEM AXLE RUNNING GEAR FOR TRAILERS OR THE LIKE
Filed July 18, 1945   7 Sheets-Sheet 7
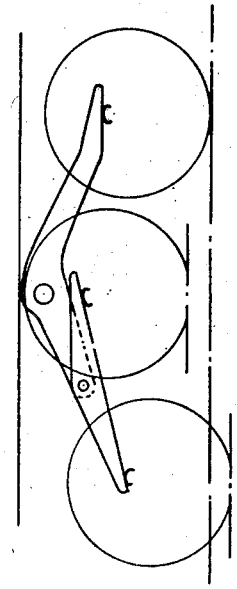
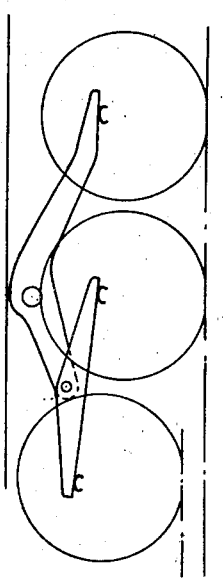
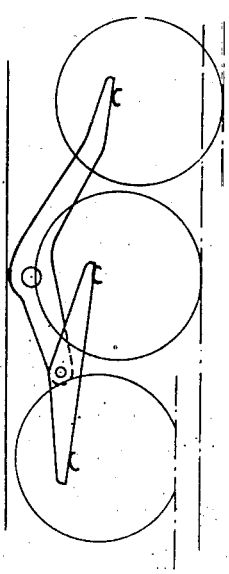
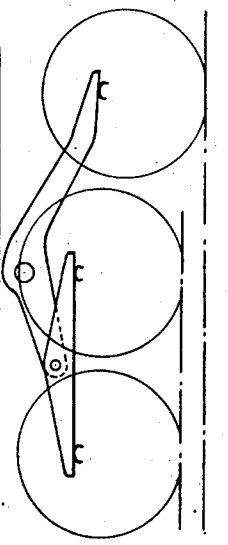
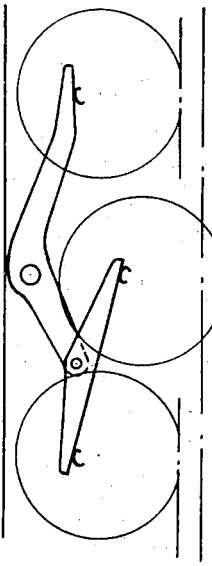
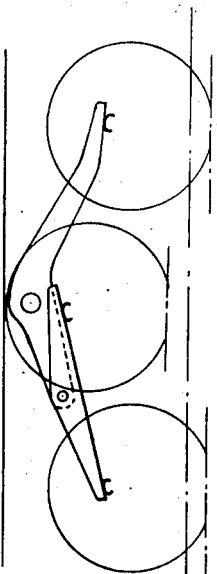
INVENTOR.
George D. Fraunfelder
BY
ATTORNEY.

Patented Jan. 18, 1949

2,459,372

UNITED STATES PATENT OFFICE 2,459,372

TANDEM AXLE RUNNING GEAR FOR TRAILERS OR THE LIKE

George D. Fraunfelder, Easton, Pa., assignor to Easton Car & Construction Company, Easton, Pa.

Application July 18, 1945, Serial No. 605,796

18 Claims. (Cl. 280—104.5)

The invention relates generaly to running gear for land vehicles and it primarily seeks to provide a novel form of running gear adapted for supporting and conveying very heavy loads over rough and uneven roadbeds, smoothly and with the load substantially evenly distributed to the individual wheels included in said gear.

In its more detailed nature the invention seeks to provide an improved running gear of the charater stated in which the load supporting wheels are arranged at each side of the trailer frame in tandem pairs, and in which the axle upon which each pair of wheels is mounted is so attached to said frame as to be capable of moving up and down about an axis disposed transversely of the direction of travel and also of rocking about a longitudinal axis disposed in said direction of travel, thereby to provide a very flexible running gear in which the wheels of each pair can move together and also individually in following the ever changing uneven contour of rough roadbeds.

Running gear of the general type referred to has been provided heretofore, but all such running gear of which I am aware has been only partialy successful in attaining the desired objective and has been more or less objectionable because of structural or operational difficulties. An example of running gear designed to permit the rocking about transverse and longitudinal axes of wheel pairs arranged in tandem relation but which has been found not entirely satisfactory is the so-called walking beam type of wheel mounting in which the wheel pairs are mounted on axles rockably supported at the ends of a walking beam which is in turn rockably mounted on a transverse axis intermediately of its ends. Such running gear has been found objectionable because in it the leading pair of wheels attached to a rigid walking beam are pushed in travelling over the roadbed, whereas the trailing pair are drawn along. Thus uneven impacts against the leading wheels tend to force the walking beam out of line, and upward impacts against said leading wheels are positively transmitted through the rigid walking beam in the form of downwardly acting forces to the trailing wheels, with the result that an objectionable jumping or bouncing action frequently develops in such running gear. It has been found that this jumping and bouncing has a tendency to set the walking beam into oscillation to a point where the speed at which the trailer is being drawn must be increased or decreased in order to stop or retard this action. It has been found also that in running gear of the character stated the wheels at the leading end of the walking beam or thrust member have a tendency to dig into soft ground, and in traversing roadbeds of this character this tendency of the leading end of the walking beam to go down increases as the trailer moves forwardly. It is the purpose of the present invention to provide an improved form of running gear which will avoid all of the above mentioned difficulties.

An object of the invention is to provide an improved running gear of the character stated in which each tandem mounted wheel pair is supported on a transversely disposed axle trailing at the end of a radius rod or carrier which is pivotally mounted at its advance end so that said trailing end is free to move up and down during travel, said rod or carrier also being pivotally mounted for pivotal movement about a longitudinal axis disposed in the direction of travel.

Another object of the invention is to provide a running gear of the character stated in which the trailing or free ends of the rods or carriers engage spring means yieldably resisting upward movement thereof.

Another object of the invention is to provide a running gear of the character stated in which the spring means comprises a leaf spring unit pivotally mounted intermediately of the ends thereof for rocking movement in a vertical plane and having each of its free ends engaging over and yieldably resisting upward movement of the free end of one rod or carrier of a set of two arranged in tandem relation.

Another object of the invention is to provide a running gear of the character stated in which three of the horizontally and vertically pivoted rods or carriers are arranged in tandem relation at each side of the trailer, the free ends of two rods or carriers in one tandem set engaging under the free ends of a rocker member pivoted intermediately of its ends on one free end of another rocker member which is pivoted intermediately of its ends on the trailer frame and has its other free end engaging over the free end of the third rod or carirer of said one tandem set.

With the above and other objects in view that will hereinafter appear, the nature of the invention will be more fully understood by following the detailed description, the appended claims, and the several views illustrated in the accompanying drawings.

In the drawings:

Figure 3 is an enlarged fragmentary side elevation illustrating the improved running gear at one side of the trailer.

Figure 4 is an enlarged detail front elevation of one of the tension members.

Figure 5 is a fragmentary horizontal section through a portion of the framing structure at one side of the trailer and illustrating the tandem pairs of wheels and the mounting thereof in plan view.

Figure 6 is a fragmentary vertical cross section illustrating one of the tension members and the mounting thereof in rear elevation, the carrier rod being shown in vertical cross section.

Figure 7 is an enlarged detail horizontal sectional view illustrating the brake actuating cylinders associated with one wheel pair.

Figure 8 is an enlarged fragmentary horizontal sectional view taken through the bearings in which one carrier rod is mounted for rocking movement about its axis, the associated wheel braking devices also being shown.

Figure 9 is an enlarged fragmentary vertical cross sectional view illustrating a portion of one of the leaf spring units and its clip.

Figure 10 is an enlarged fragmentary side elevation illustrating a modified form of running gear in which three pairs of wheels are arranged in tandem relation.

Figure 11 is an end elevation of the running gear portion shown in Figure 10.

Figures 12 through 17 are diagramatic side elevations illustrating six different relative positions of the wheel pairs at one side of the modified form of running gear shown in Figures 10 and 11.

Figure 1:
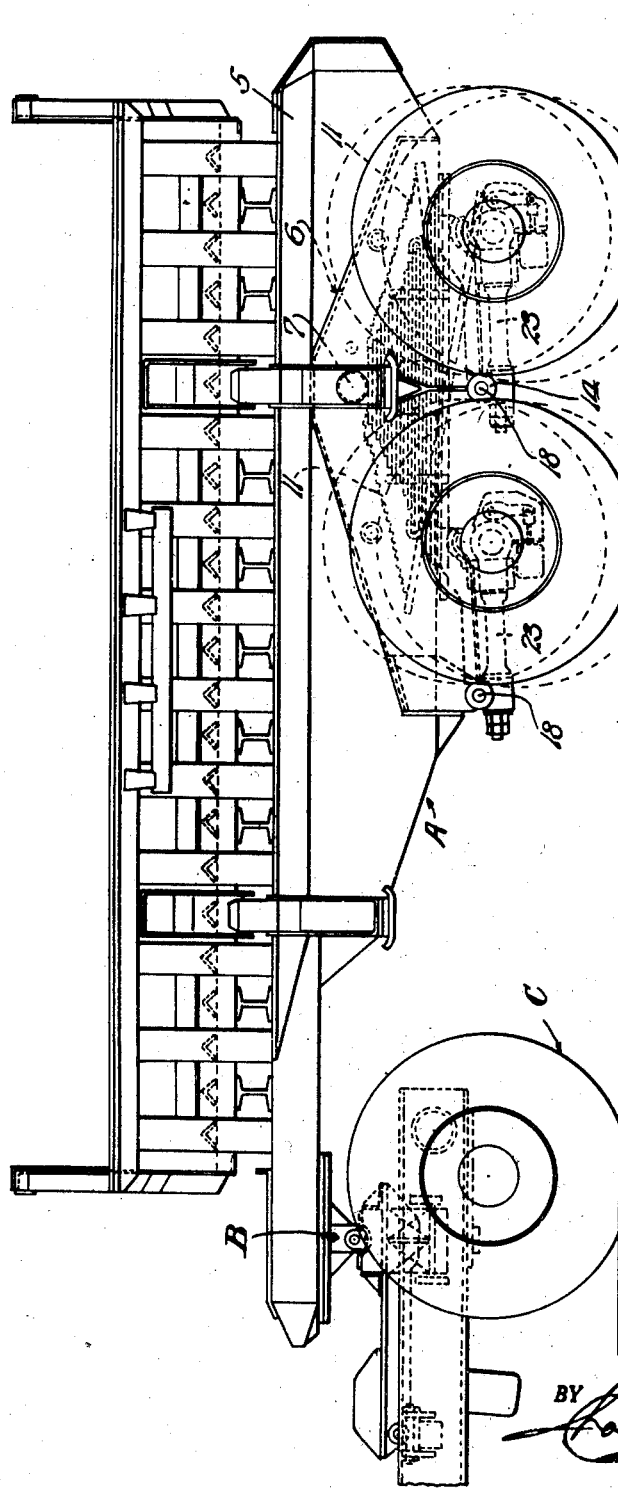
Figure 1 is a side elevation illustrating a trailer structure embodying the invention.
Figure 2:
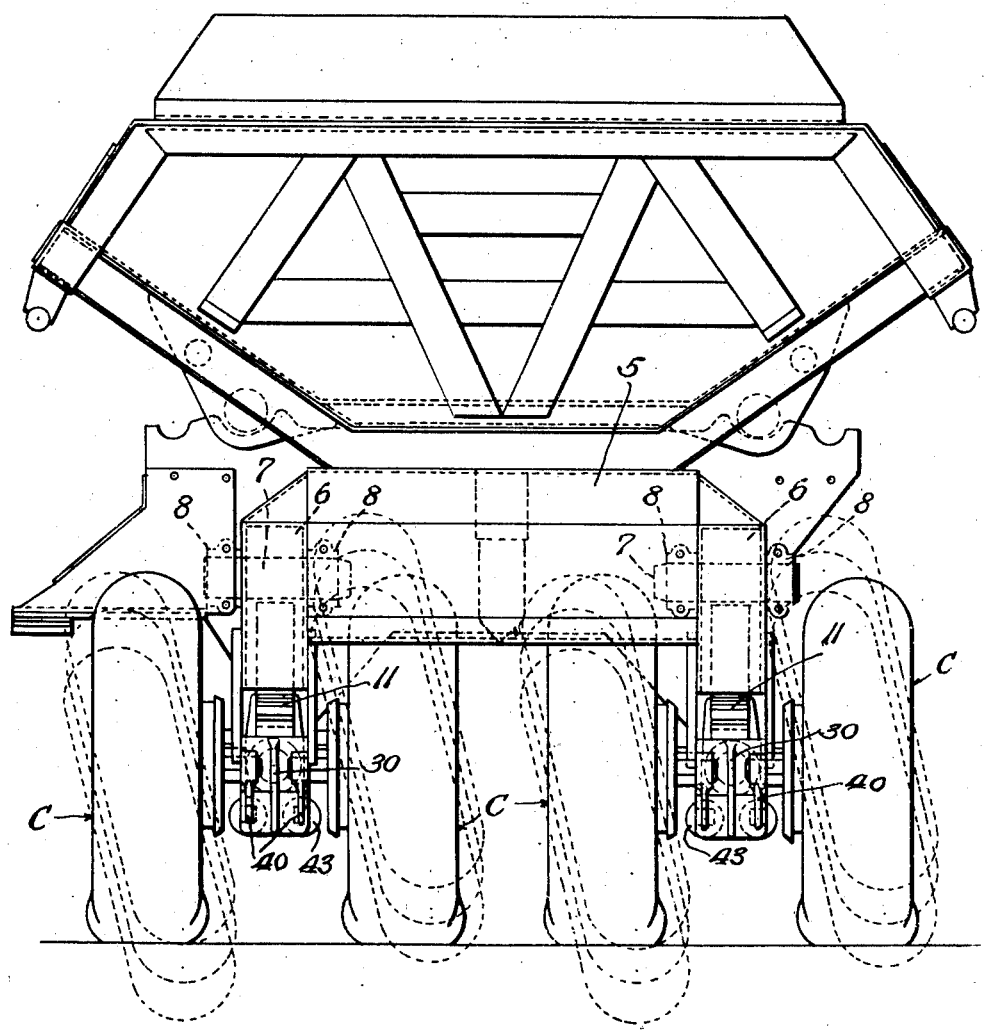
Figure 2 is an end elevation illustrating the trailer structure shown in Figure 1.

In the example of embodiment of the invention herein disclosed the trailer generally designated A is connected in the usual manner, as at B, to the tractor unit C. See Figure 1.

It is to be understood that the trailer may embody any form of body structure, the present invention having to do with the running gear and its mounting only, and not being limited to special frame or body forms.

The trailer generally designated A includes a frame 5 having a vertical channeling 6 at each side thereof. In each channeling a fulcrum pin or shaft 7 is mounted transversely in suitable bearings 8, and on each said shaft is rockably mounted a bearing member 9 which is secured as at 10 to a depending leaf spring unit 11. It will be observed by reference to Figure 3 that each spring unit has one leaf reversely bent as at 12 at each end thereof to constitute an abutment member engageable with a fixed stop 13 mounted on the framing as illustrated in dotted lines in Figure 3.

Each channel also has a bearing 14 secured thereto centered beneath the spring mounting shaft 7, and another bearing member 15 depending from the advance end thereof as shown in Figure 3. To each said bearing is connected a tension member or draft mounting 16 for a pair of wheels. The members 16 preferably constitute castings and serve to mount the pairs of wheels in tandem relation in the manner clearly illustrated in Figures 1 and 5.

It will be apparent by reference to Figures 3 and 5 that each of the tension or draft members 16 includes a cross bearing portion 17 at its front end which is pivoted on a pin 18 mounted in the respective bearing 14 or 15, and a U-shaped spring and rest 19 which is extended upwardly in the manner clearly illustrated in Figures 3 and 6 so as to partially embrace one free end portion of the respective leaf spring unit 11. Each rest portion 19 is equipped with a removably mounted arcuate floor piece 20 upon which the respective end of the leaf spring unit is supported. Each of the tension members 16 also includes a depending bearing portion 21 at the advance end thereof, and a similar bearing portion 22 at the free trailing end thereof, and it will be apparent by reference to Figure 3 that the bearing portions 21 and 22 of each said member are coaxially arranged.

A carrier rod 23 is rockable about its longitudinal axis in each aligned pair of tension member bearings 21 and 22, each said rod having a rear cylindrical portion 24 rockably mounted in the rearmost bearing 22 and a front cylindrical portion 25 mounted in the front bearing portion 21. An abutment shoulder 26 and front abutment means 27 definitely place each of the carrier rods 23 with respect to the particular front bearing 21, and at its rear end each carrier rod is equipped with a transversely disposed hub 28 in which a cross shaft 29 is fixed, by welding or otherwise. At its rear end each carrier rod also has a centrally disposed rearwardly extended web 30 and depending transverse webs 31. It will be noted by reference to Figure 8 that each shaft 29 has a brake means supporting ring 32 welded thereon at each side of the hub 28, and a bearing bracket 32 also is secured on each said shaft adjacent each end of the respective hub 28.

A wheel 34 is mounted in the conventional manner at each end of each shaft 29, and each wheel includes a brake drum 35 and conventional brake shoes 36 pivotally supported as at 37 on the respective ring 32. Each braking means includes a shoe spreading or actuater rocker 38 pivotally mounted in a bearing 39 secured on the respective ring 32 and extending through the adjacent bearing bracket 33. Inwardly of each bearing bracket 33 each rocker shaft has a crank 40 fixed thereon, and each crank is connected with a thrust rod 41 projecting forwardly and connected with a piston 42 within a pressure cylinder 43 mounted on one of the supporting webs 31. Pressure fluid is delivered to the cylinders 43 through individual ducts 44 from a split fitting 45 secured on the bracket 46 projecting from the transverse webs 31, and said individual ducts are served by a duct 47 from a remotely disposed brake control (not shown). See Figures 7 and 8. It will be apparent that when the pistons in the cylinders 43 are projected rearwardly by the remotely controlled fluid pressure, the rocker members 38 will be actuated to apply the conventional braking means to the individual wheels 34.

It will be apparent by reference to Figures 1, 2, 3 and 5 of the drawings that as the trailer is drawn over a roadbed the individual wheels mounted in tandem pair will be permitted to follow the contour of the roadbed however rough it might be. The pairs of wheels are free to move upwardly with the carrier rods 23 and the tension or draft members 16 swinging freely in the vertical plane about the swing centers 18, the upward movement of the wheel pairs being yieldably resisted by the free ends of the rockably mounted leaf spring units 11. The individual transversely disposed axles 29 on which the wheel pairs are mounted are free to rock in a transverse plane about the generally horizontal axes of the carrier rods 23.

By attaching all tandem pairs of wheels as trailing units at the free ends of swingably mounted carrier rods, and in turn supporting the free ends of the wheel pair carrying elements at the free ends of rockably mounted leaf spring units, all tendency of the wheels to dig into soft roadbeds, and of the running gear as a whole to develop objectionable jumping or bouncing action is eliminated.

As previously described, all excessive upward swinging movement of the free ends of the leaf spring unit is stopped by contact of the return bent leaf end abutments 12 and the fixed stops 13. The spring units assist in absorbing shock and also guide the swingably mounted carrier rods 23 and tension members 18 by reason of the embracement of the free ends of the leaf spring units between U-shaped trailing end extremities 19 of the tension members. In this manner all tendencies of the swingably mounted units to move sidewise during rough travel are controlled.

Any load imposed on the frame is carried to a central point, namely the mounting of the leaf spring units as at 7. This load is in turn split to each end of a given leaf spring unit, half of the load being carried by the spring and rest 19, the carrier rod axle, the main axle, and then again split to each of the two tires. Thus it can be said that up to the limit of movement restricted through the rockable spring unit and its stop means, each tire will carry its own share of the total load imposed upon the running gear and this is important and will produce a stable, smoothly running unit.

In the modified form of trailer unit illustrated in Figures 10 through 17 the frame structure is designated 48 and has a plurality of wheel receiving recesses 49 and a channel 50 arranged in a central plane. It will be apparent by reference to Figures 10 and 11 that the recesses accommodate the positioning of three sets or pairs of wheels arranged in tandem relation at each side of the trailer.

In each central channel 50 a rigid lever 51 is pivotally supported intermediately of its ends on a transverse pin 52. Each lever includes a short forward arm 53 and a relatively long rearwardly extending arm 54. Each short arm is pivoted as at 55 at its front end to a second rigid member 56 intermediately of the ends thereof.

The frame structure at each side of the trailer is provided with three depending bearing brackets 57 to which three tension members 58 are pivoted at their front ends as at 59. The tension members are constructed in the same manner as the previously described tension members and include U-shaped rest portions 60 at their trailing ends, one thereof engaging each of the free ends of the rigid member 56 and the rest portion 60 of the third tension member engaging under the rearwardly projected end extremity of the first mentioned rigid member 51. Each tension member 58 also includes front and rear axially aligned bearings 61 which depend therefrom in the manner illustrated in Figure 10 and serve to rockably support carrier rods 62 which are constructed in the manner previously described and support cross shafts 63 on which the pairs of wheels 64 are mounted.

The sets or pairs of wheels 64 arranged in tandem relation as previously described are free to move upwardly and downwardly and also to rock about the axes of the carrier rods 62 in following rough roadbed contours, and the upward swinging movement of each of the tension members 58 will be resisted by contact with the respective rigid members 56 or 54. Several shifted positions of the wheels are indicated, and in Figures 12 through 17, six additional differential positions of the wheel pairs are illustrated.

While examples of the structure and arrangement of the devices comprising the invention have been disclosed herein, it is to be understood that the structural details may be modified in various ways without departing from the spirit and scope of the invention as defined in the appended claims.

I claim:

1. In a land vehicle running gear, a frame, a pair of wheels arranged side by side on a single axle disposed horizontally and tranversely with respect to the intended line of travel, a single carrier, a tension member pivotally supporting said carrier for rocking movement about its longitudinal axis, disposed centrally longitudinally between said wheels, means pivotally supporting said tension member at its advance end extremity on said frame for swinging movement in a vertical longitudinal plane, means mounting said axle at the free trailing end of said carrier, and a single spring means disposed centrally between said wheels and yieldably resisting upward movement of the free trailing end of said tension member.

2. In a land vehicle running gear, a frame, two pairs of wheels arranged in tandem relation with the wheels of each pair disposed side by side on a single axle disposed transversely with respect to the intended line of travel, a single carrier for each pair of wheels, a tension member pivotally supporting each said carrier for rocking movement about its longitudinal axis, disposed centrally longitudinally between said wheels, means pivotally supporting each said tension member at its advance end extremity on said frame for swinging movement in a vertical longitudinal plane, means mounting each said axle at the free trailing end of one said carrier, and a single spring means disposed centrally between each said pair of wheels and yieldably resisting upward movement of the free trailing end of the respective tension member.

3. In a land vehicle running gear, a frame, two pairs of wheels arranged in tandem relation with the wheels of each pair disposed side by side on an axle disposed transversely with respect to the intended line of travel, a longitudinal carrier for each pair of wheels, means pivotally supporting each carrier at its advance end extremity on said frame for swinging movement in a vertical longitudinal plane, means mounting each said axle at the free trailing end of one said carrier, means pivotally supporting each said carrier for rocking movement about its longitudinal axis, and a leaf spring unit pivotally supported intermediately of its ends on the frame and having its free ends disposed in position for resisting upward movement of the free trailing end of each said carrier.

4. In a land vehicle running gear, a frame, two pairs of wheels arranged in tandem relation with the wheels of each pair disposed side by side on an axle disposed transversely with respect to the intended line of travel, a longitudinal carrier for each pair of wheels, means pivotally supporting each said carrier at its advance end extremity on said frame for swinging movement in a vertical longitudinal plane, means mounting each said axle at the free trailing end of one said carrier, means pivotally supporting each said carrier for rocking movement about its longitudinal axis, a leaf spring unit pivotally supported intermediately of its ends on the frame and having its free ends disposed in position for resisting upward movement of the free trailing end of each said carrier, and abutment means limiting upward movement of each end of said spring unit.

5. In a land vehicle running gear, a frame, two pairs of wheels arranged in tandem relation with the wheels of each pair disposed side by side on an axle disposed transversely with respect to the intended line of travel, a longitudinal carrier for each pair of wheels, means pivotally supporting each said carrier at its advance end extremity on said frame for swinging movement in a vertical longitudinal plane, means mounting each said axle at the free trailing end of one said carrier, means pivotally supporting each said carrier for rocking movement about its longitudinal axis, a leaf spring unit pivotally supported intermediately of its ends on the frame and having its free ends disposed in position for resisting upward movement of the free trailing end of each said carrier, and abutment means limiting upward movement of each end of said spring unit, one leaf at each end of the spring having a return bend engageable as a yieldable stop with the abutment means associated with the respective end of the spring unit.

6. In a land vehicle running gear, a frame, a longitudinal resistor member pivotally supported intermediately of its ends on the frame for rocking movement in a vertical longitudinal plane, two tension members disposed in tandem alignment beneath the resistor member and with their advance ends pivotally supported on the frame and their free trailing ends resisted against upward movement by contact with the respective ends of said resistor member, a carrier rod supported by each tension member for rocking movement about its longitudinal axis disposed in the intended general direction of travel, a transverse axle supported at the trailing end of each carrier rod, and a pair of wheels supported side by side on each axle.

7. In a land vehicle running gear, a frame, a longitudinal resistor member pivotally supported intermediately of its ends on the frame for rocking movement in a vertical lonigtudinal plane, two tension members disposed in tandem alignment beneath the resistor member and with their advance ends pivotally supported on the frame and their free trailing ends resisted against upward movement by contact with the respective ends of said resistor member, a carrier rod supported by each tension member for rocking movement about its longitudinal axis disposed in the intended general direction of travel, a transverse axle supported at the trailing end of each carrier rod, and a pair of wheels supported side by side on each axle, each said tension member having a U-shaped rest at its trailing end partially embracing the end of the resistor member engaged thereby.

8. In a land vehicle running gear, a frame, a longitudinal resistor member pivotally supported intermediately of its ends on the frame for rocking movement in a vertical longitudinal plane, two tension members disposed in tandem alignment beneath the resistor member and with their advance ends pivotally supported on the frame and their free trailing ends resisted against upward movement by contact with the respective ends of said resistor member, a carrier rod supported by each tension member for rocking movement about its longitudinal axis disposed in the intended general direction of travel, a transverse axle supported at the trailing end of each carrier rod, and a pair of wheels supported side by side on each axle, said resistor member comprising a leaf spring unit effective to yieldably resist upward movement of the trailing ends of the tension members, and each tension member having a U-shaped rest at its trailing end partially embracing the end of the leaf spring unit engaged thereby.

9. In a land vehicle running gear, a frame, a pair of wheels arranged side by side on an axle disposed horizontally and transversely with respect to the intended line of travel, a tension member disposed in generally horizontal position and extending in the intended direction of travel, means pivotally supporting the tension member at its advance end for swinging movement about a horizontal axis, a carrier rod supporting the axle, means on the tension member pivotally supporting said carrier rod for rocking movement about a longitudinal axis disposed in the intended direction of travel, and means yieldably resisting upward movement of the free trailing end of said tension member.

10. In a land vehicle running gear, a frame, a pair of wheels arranged side by side on an axle disposed horizontally and transversely with respect to the intended line of travel, a tension member disposed in generally horizontal position and extending in the intended direction of travel, means pivotally supporting the tension member at its advance end for swinging movement about a horizontal axis, a carrier rod supporting the axle, means on the tension member pivotally supporting said carrier rod for rocking movement about a longitudinal axis disposed in the intended direction of travel, means yieldably resisting upward movement of the free trailing end of said tension member, said carrier rod having bracket means thereon, each said wheel having brake means associated therewith, and remotely operable brake means actuaters supported on said bracket means.

11. Structure as defined in claim 7 in which each carrier rod is equipped with bracket means, each said wheel is equipped with brake means, and in which there are included remotely operable brake means actuaters supported on said bracket means.

12. In a land vehicle running gear, a frame, three pairs of wheels arranged in tandem relation with the wheels of each pair disposed side by side on an axle disposed transversely with respect to the intended line of travel, a longitudinal carrier for each pair of wheels, means pivotally supporting each said carrier at its advance end extremity on said frame for swinging movement in a vertical longitudinal plane, means mounting each said axle at the free trailing end of one said carrier, means pivotally supporting each said carrier for rocking movement about its longitudinal axis, and movable means resisting upward movement of the free trailing end of each said carrier.

13. In a land vehicle running gear, a frame, three pairs of wheels arranged in tandem relation with the wheels of each pair disposed side by side on an axle disposed transversely with respect to the intended line of travel, a longitudinal carrier for each pair of wheels, means pivotally supporting each said carrier at its advance end extremity on said frame for swinging movement in a vertical longitudinal plane, means mounting each said axle at the free trailing end of one said carrier, means pivotally supporting each said carrier for rocking movement about its longitudinal axis, and movable means resisting upward movement of the free trailing end of each said carrier, said movable means comprising a resistor member disposed longitudinally above the wheel pairs and pivoted intermediately of its ends on the frame and having its free trailing end overlying and contacting the free trailing end of the carrier associated with the rearmost pair of wheels, and a longitudinally disposed resistor member pivoted intermediately of its ends on the advance end of the first mentioned resistor member and having each free end thereof overlying and engaging the free trailing end of one of the remaining two carriers.

14. In a land vehicle running gear, a frame, a longitudinal resistor member pivotally supported intermediately of its ends for rocking movement in a vertical longitudinal plane, two tension members disposed in tandem alignment beneath the resistor member and with their advance ends pivotally supported on the frame and their free trailing ends resisted against upward movement by contact with the respective ends of said resistor member, a carrier rod supported by each tension member for rocking movement about its longitudinal axis disposed in the intended general direction of travel, a transverse axle supported at the trailing end of each carrier rod, and a pair of wheels supported side by side on each axle, a third wheel pair arranged in tandem relation to the other two pair and tension member and carrier rod supported in like manner, and a second longitudinal resistor member pivotally supported intermediately of its ends on the frame and having its trailing end overlying and resisting upward movement of the third tension member and its advance end pivotally connected with and forming said pivotal support for the first mentioned resistor member.

15. In a land vehicle running gear, a frame, a pair of wheels arranged side by side on an axle disposed horizontally and transversely with respect to the intended line of travel, a longitudinal carrier, a tension member pivotally supporting said carrier for rocking movement about its longitudinal axis, means pivotally supporting said tension member at its advance end extremity on said frame for swinging movement in a vertical longitudinal plane, means mounting said axle at the free trailing end of said carrier, and means yieldably resisting upward movement of the free trailing end of said tension member, said last named means comprising a leaf spring, and said tension member having a U-shaped end portion slidably embracing a free end portion of said spring.

16. In a land vehicle running gear, a frame, a pair of wheels arranged side by side on an axle disposed horizontally and transversely with respect to the intended line of travel, a longitudinal carrier, a tension member pivotally supporting said carrier for rocking movement about its longitudinal axis, means pivotally supporting said tension member at its advance end extremity on said frame for swinging movement in a vertical longitudinal plane, means mounting said axle at the free trailing end of said carrier, and means yieldably resisting upward movement of the free trailing end of said tension member, each said last named means comprising a leaf spring, and each said tension member having a U-shaped end portion slidably embracing a particular free end portion of said spring.

17. In a land vehicle running gear, a frame, two pairs of wheels arranged in tandem relation with the wheels of each pair disposed side by side on an axle disposed transversely with respect to the intended line of travel, a longitudinal carrier for each pair of wheels, a tension member pivotally supporting each said carrier for rocking movement about its longitudinal axis, means pivotally supporting each said tension member at its advance end extremity on said frame for swinging movement in a vertical longitudinal plane, means mounting each said axle at the free trailing end of one said carrier, and a longitudinal resistor member pivotally supported intermediately of its ends on the frame and having its free ends disposed in position for resisting upward movement of the free trailing end of each of said tension members.

18. In a land vehicle running gear, a frame, two pairs of wheels arranged in tandem relation with the wheels of each pair disposed side by side on an axle disposed transversely with respect to the intended line of travel, a longitudinal carrier for each pair of wheels, a tension member pivotally supporting each said carrier for rocking movement about its longitudinal axis, means pivotally supporting each said tension member at its advance end extremity on said frame for swinging movement in a vertical longitudinal plane, means mounting each said axle at the free trailing end of one said carrier, and a leaf spring unit pivotally supported intermediately of its ends on the frame and having its free ends disposed in position for resisting upward movement of the free trailing end of each of said tension members.

GEORGE D. FRAUNFELDER.

REFERENCES CITED

The following references are of record in the file of this patent:

UNITED STATES PATENTS

| Number | Name | Date |
| --- | --- | --- |
| 1,533,518 | Schlack | Apr. 14, 1925 |
| 1,902,712 | Leipert | Mar. 21, 1933 |
| 2,194,322 | Peterman | Mar. 19, 1940 |
| 2,269,728 | Mills | Jan. 13, 1942 |
| 2,336,814 | Suter | Dec. 14, 1943 |
| 2,390,912 | Ayers | Dec. 11, 1945 |
| 2,411,885 | Larison | Dec. 3, 1946 |

FOREIGN PATENTS

| Number | Country | Date |
| --- | --- | --- |
| 312,475 | Great Britain | May 30, 1929 |

Certificate of Correction

Patent No. 2,459,372.  January 18, 1949.

GEORGE D. FRAUNFELDER

It is hereby certified that errors appear in the printed specification of the above numbered patent requiring correction as follows:

Column 6, lines 15 to 18, claim 1, for "carrier, a tension member pivotally supporting said carrier for rocking movement about its longitudinal axis, disposed centrally longitudinally between said wheels, means pivotally" read *carrier disposed centrally longitudinally between said wheels, a tension member pivotally supporting said carrier for rocking movement about its longitudinal axis, means pivotally*; same column, lines 31 to 34, claim 2, for "wheels, a tension member pivotally supporting each said carrier for rocking movement about its longitudinal axis, disposed centrally longitudinally between said wheels, means" read *wheels disposed centrally longitudinally between said wheels, a tension member pivotally supporting each said carrier for rocking movement about its longitudinal axis, means*;

and that the said Letters Patent should be read with these corrections therein that the same may conform to the record of the case in the Patent Office.

Signed and sealed this 5th day of July, A. D. 1949.

[SEAL]

THOMAS F. MURPHY,
*Assistant Commissioner of Patents.*